United States Patent
Pinnerup et al.

(10) Patent No.: US 6,701,795 B2
(45) Date of Patent: Mar. 9, 2004

(54) METHOD FOR TESTING A HEATING SYSTEM

(75) Inventors: Mads Pinnerup, Aarhus (DK); Jørgen Seerup, Mårslet (DK); Eva Kühne, Silkeborg (DK)

(73) Assignee: Danfoss A/S, Nordborg (DK)

( * ) Notice: Subject to any disclaimer, the term of this patent is extended or adjusted under 35 U.S.C. 154(b) by 103 days.

(21) Appl. No.: 09/987,946

(22) Filed: Nov. 16, 2001

(65) Prior Publication Data

US 2002/0059841 A1 May 23, 2002

(30) Foreign Application Priority Data

Nov. 18, 2000 (DE) .......................... 100 57 360

(51) Int. Cl.⁷ .................. F24D 19/10; G08B 26/00; G01M 19/00; G01R 31/327; G05B 23/02
(52) U.S. Cl. .................. 73/865.9; 165/11.1; 237/81; 324/417; 324/511; 324/512
(58) Field of Search .................. 73/865.9; 324/417, 324/500, 501, 512, 527, 537, 511; 165/11.1, 11.2; 237/91; 374/1, 2

(56) References Cited

U.S. PATENT DOCUMENTS

| | | | |
|---|---|---|---|
| 3,347,085 A | * 10/1967 | Harris | 374/1 |
| 3,447,079 A | * 5/1969 | Durbin | 324/511 X |
| 4,774,526 A | * 9/1988 | Ito | 324/542 X |
| 4,987,556 A | * 1/1991 | Aoki | 324/420 X |
| 5,043,670 A | * 8/1991 | Isfeld et al. | 324/508 |
| 5,058,443 A | * 10/1991 | Riedmaier | 73/865.9 |
| 2002/0145512 A1 | * 10/2002 | Sliechter, III et al. | 340/407.1 |

FOREIGN PATENT DOCUMENTS

| | | | | |
|---|---|---|---|---|
| DE | 3422451 | * | 1/1986 | F23N/5/24 |
| DE | 44 33 387 A1 | | 3/1995 | |
| DE | 197 54 837 A1 | | 7/1999 | |
| DE | 198 00 448 A1 | | 7/1999 | |
| EP | 0 923 013 A1 | | 6/1999 | |

OTHER PUBLICATIONS

Derwent–ACC–No. 1977–A6294Y abstract of BE 845830 A Dec. 1976 Assignee De Blieck T "Test Device for Central Heating System Control Head—has Switch Sequentially Connected to Contacts of Different Components."*
"Laptop im Heizungskeller," Heizung, *sbz*, No. 19, 1992, pp. 82–83, month not given.
"Hometronic—Das Einzelraum–Regelsystem der Zukunft," Honeywell CENTRA, 1997 month not given, 4 pages.

* cited by examiner

*Primary Examiner*—Thomas P. Noland
(74) *Attorney, Agent, or Firm*—Burns, Doane, Swecker & Mathis, LLP

(57) ABSTRACT

A method for testing a heating system with at least one basic unit, which controls activating elements of individual heating circuits, with the basic unit being connected with setting units. To simplify the testing of such heating systems, the elements available in the heating system are arranged hierarchically in steps, with the steps being tested in a predetermined order, one after the other.

19 Claims, 1 Drawing Sheet

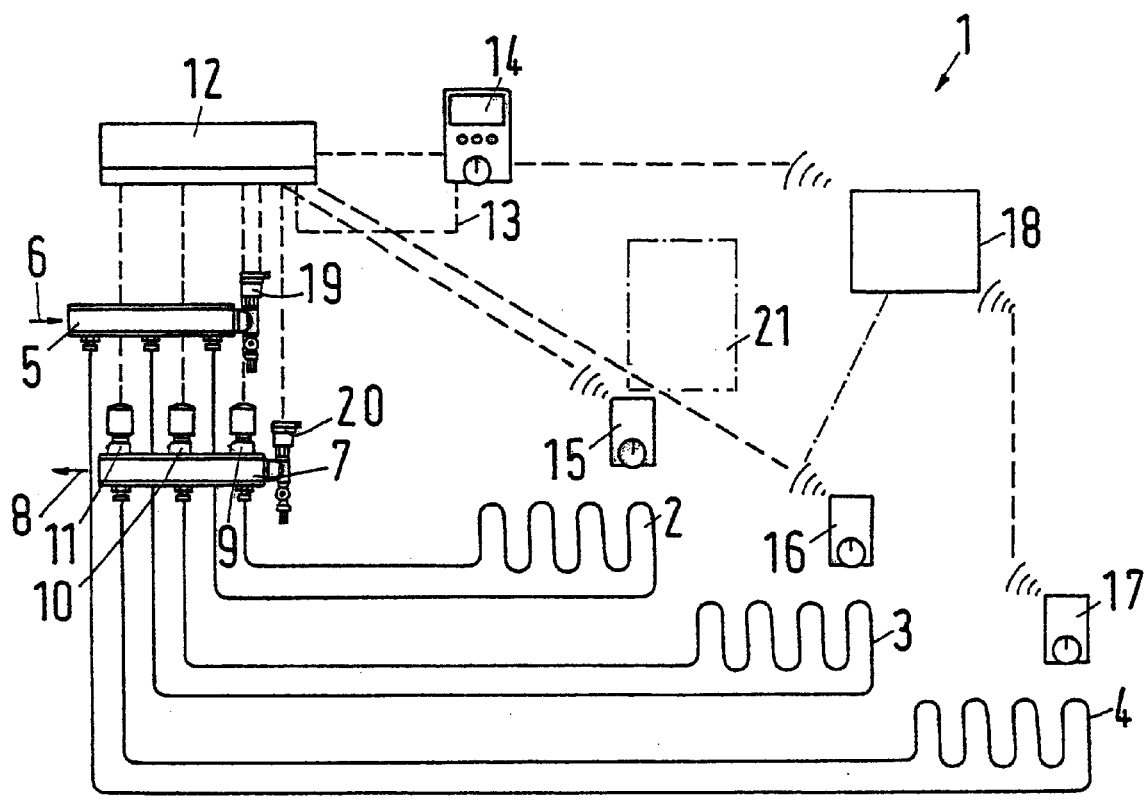

METHOD FOR TESTING A HEATING SYSTEM

FIELD OF THE INVENTION

The invention concerns a method for testing a heating system with at least one basic unit, which controls activating elements of individual heating circuits, the basic unit being connected with setting units by way of signals.

BACKGROUND OF THE INVENTION

In many cases, floor heating systems are designed so that the individual heating circuits, that is, pipes which are arranged in the floor, receive the heating fluid, usually hot water, from a distributor, activating elements, usually valves, being arranged in the distributor. The distributor receives the heating fluid from a heat source, for example, a district heating net, or a heat exchanger connected with a district heating net, or a boiler. The control of the distribution of the heating fluid to the individual heating circuits occurs via the activating elements, which are for this purpose controlled by a basic unit. This basic unit, again, receives signals from setting units, for example room thermostats.

Another heating system uses radiators, through which heating water can also flow, to supply heat to the room to be heated. Such radiators are controlled by valves, which are arranged direct on the radiator. A commonly used control has thermostatically operated valves, in which the desired value is, for example, preset by turning a handle. A further development enables a user to change the desired value also without turning the handle, for example by means of timed or remote control, the remote control signals coming from the basic unit.

Contrary to heating systems, which are exclusively controlled by manually controlled radiator thermostats, it is practically impossible for the installer to perform a complete check of the heating system at a reasonable cost and effort. Therefore, the check is normally limited to a pressure check, to find out if the heating pipes are tight, and a visual check to make sure that the individual heating pipes are connected correctly. For the control of the heat distribution, that is, the cooperation between the setting units, the distributor, if any, the activating elements and the basic units, however, such testing possibilities do not exist. Of course, the installer can test, if the floor in a room becomes warm. Due to the relatively large thermal inertia, however, it is extremely difficult to find out, if a certain thermostat controls the correct heating circuit, or if the basic unit contacts the "correct" thermostat. The installer, therefore, often leaves a system without being certain that it is correctly installed and works satisfactorily.

SUMMARY OF THE INVENTION

The invention is based on the task of simplifying the testing of a floor heating system.

With a method as mentioned in the introduction, this task is solved in that the elements available in the heating system are arranged hierarchically in steps, these steps being tested one after the other in a predetermined order.

With this method it is possible to perform a systematic test of a floor heating system with regard to faults. The installer can then work his way through the individual hierarchical levels. Dividing the elements into individual hierarchical levels makes it easier for the installer to maintain the overview, leaving out none of the testing steps.

It is particularly preferred that the test of a step does not begin, until the test of superior step has indicated a faultless state. Thus, it is ensured that the installer cannot omit a step, as the test of a hierarchically lower step cannot start, until the test of the hierarchically higher step has been successfully finished. This stepwise method has several advantages. Firstly, it is ensured that the starting conditions for the lower step are faultless. Thus, faults on elements, which are not caused by faults in these elements but by faulty starting information, cannot be indicated by accident. Secondly, the elements of the lower step can work with faultless starting conditions, so that the tests are made under realistic conditions. Finally, the installer is also compelled to remedy any faults completely, as otherwise, he cannot go on with the test.

It is preferred that during a first part it is tested, if the elements are installed correctly, and during a second part, if the elements work in a predetermined way. During installation, faults may occur for several reasons. When testing first, if the elements have been installed correctly, the test can be limited to a certain area of fault reasons, namely the installation, that is, mounting and connection of the elements in questions. After having made sure that the elements are installed correctly, the next step can be started, namely testing, if the elements work in the predetermined way. This simplifies the fault finding.

Preferably, the occurrence of a fault is indicated by way of kind and location of the fault. This makes it easier for the installer to remedy the fault. The location can virtually mean the physical spot, in which the element is arranged. In many cases, however, it is sufficient to state, in which step the fault has occurred, as the installer knows the elements available in this step and the number of elements per step is limited.

Preferably it is tested, if the number of the connected setting units corresponds to the number of the setting units signed in. This is a simple, but effective way of testing. During the installation, the basic unit must be informed about the number of setting units, from which information must be expected. For this purpose, these setting units are signed on to the basic unit, for example in that the basic unit is informed about an address, under which the setting unit in question can be recognised. However, then a physical connection has to be allocated to each setting unit. The number of connections must correspond to the number of setting units signed in. The method applies for setting units, which control the heat distribution in a floor heating system, and which are, therefore, usually arranged in a distributor, as well as for radiator valves, which are arranged direct on the radiators.

Preferably, it is tested, if with a wireless connection between the setting units and the basic unit a signal strength of received signals of a predetermined minimum value is obtained. In the past, floor heating systems often did not have a comfortable setting opportunity, that is, the user or consumer merely had the chance of changing a valve position on the distributor. The subsequent fitting of thermostatic elements or other setting devices in the individual rooms is therefore difficult, when it comprises the running of cables. When, however, wireless connections between the setting units and the basis are chosen, the problem of having to run cables through the whole apartment does not arise. The signal transmission then takes place by means of electromagnetic waves, infrared, or ultrasonic or some other kind of wireless transmission. In this case, however, it must be ensured that the connections between the individual setting units and the basic unit have a signal strength, which is sufficient for a reliable transmission of the information.

When this is not the case, a fault is reported. This method also applies for wireless, remote-controlled radiator thermostats, which are signed in on the basic unit, upon which the basic unit knows that such a radiator thermostat should be available. If such a radiator thermostat is signed in, but cannot be "found" by the basic unit, for example because of insufficient signal strength, a fault is reported.

It is preferred that, in case of insufficient signal strength, an amplifier is arranged on a path between the setting unit and the basic unit. An amplifier of this kind, also called "repeater" or "rooter", receives the signal from the setting unit and sends it on in an amplified form to the basic unit or vice versa. In this case, the installer is not only alerted on the fault, he also gets a solution proposal.

It is particularly preferred that the amplifier is signed in on the basic unit. The basic unit then knows that an amplifier is available.

This is particularly advantageous, when, during operation, the strength of the received signals is tested continuously or from time to time, and, when found too weak, the signal of the setting unit in question is led via an available amplifier. When, for example, modifications are going on in the house, or furniture is rearranged, the transmission conditions can change. This will be established by means of a repeated or continuous measuring of the signal strength. In many cases, it is then not even necessary to install a new amplifier. Due to the signing in, the basic unit is aware that an amplifier is available in the area. It then leads the signals of the setting unit transmitting the too weak signals through this amplifier, so that the signal level becomes sufficient again.

Preferably, the voltage supply to the setting units is tested. This is particularly advantageous, when the individual setting units, for example thermostatic elements, are supplied with voltage via a battery. In this case, a battery voltage meter can provide information about the state of the battery, so that information is given, when the battery must be replaced, or when it does not work optimally already during mounting.

Preferably, it is tested, if the activating elements can be contacted and are working. Here again, the testing is divided in two, namely one test to make sure that the signal actually reaches the activating elements and one to make sure that the activating element in question reacts when a signal occurs. For this purpose, for example, a position measuring in the activating element, a current measuring or the like, can be used.

It is also advantageous, in connection with a flow temperature control of the distributor it is tested, if sensors for the detection of flow and return temperatures are available and working. This test is relatively simple.

Preferably, it is tested, if a regulating unit for influencing the flow temperature is available, can be contacted and is working. Also here, a reaction of the regulating unit is tested several times, so that a fault is more easily recognisable with regard to kind and location, if any.

BRIEF DESCRIPTION OF THE DRAWING FIGURE

In the following, the invention is described on the basis of a preferred embodiment in connection with the drawing, showing:

only FIGURE: a schematic view of a floor heating system

DETAILED DESCRIPTION OF THE INVENTION

A floor heating system 1 has several heating circuits 2, 3, 4, which are arranged in the floor in the shape of looped pipes. In the following description, it is anticipated that each heating circuit 2, 3, 4 heats one room. However, it is also possible to arrange several heating circuits in one room.

Further to the heating circuits 2, 3, 4, which are in the form of floor heating systems, the heating system shown in the FIGURE can also comprise radiators, which are not shown in detail. Of these radiators, at least one is controlled via a wireless radiator thermostat, that is, the radiator thermostat receives information, which are described below, via a wireless path, that is, via radio or infrared light.

The supply to the heating circuits 2, 3, 4 takes place via an inlet distributor 5, which is connected with a source for a heat transfer fluid shown by means of an arrow 6, for example, a district heating net.

The outlet of the heating circuits 2, 3, 4 is connected with an outlet distributor 7, which returns the heat transfer fluid to the fluid source, here shown by means of an arrow 8. Together, the inlet distributor 5 and the outlet distributor 7 form a distributor. In the outlet distributor 7, an activating element 9, 10, 11 is provided for each heating circuit 2, 3, 4, the activating elements being controlled by a basic unit 12. Of course, the activating elements 9, 10, 11 can also be placed in the inlet distributor 5.

The basic unit 12 is connected with a zone control unit 14 via an electrical cable 13. By means of the zone control unit 14, it is possible to join different rooms to zones, and to run a predetermined heating programme in each zone. A heating programme of this kind could, for example, comprise a night-setback, the week-end setback differing from the weekday setback.

Further, a room thermostat 15, 16, 17 is arranged in each room, the room thermostats 15, 16, 17 having a wireless connection with the basic unit 12. An information transmission from the basic unit to the individual room thermostats 15, 16, 17 takes place by means of electromagnetic waves, for example radio.

The room thermostat 17 is too far away from the basic unit 12, so that the signal strength for the radio transmission is not sufficient to ensure a reliable information transmission. Therefore, an amplifier 18 is arranged between the basic unit 12 and the room thermostat 17, the amplifier 18 also being called "rooter" or "repeater".

Further, on the distributor 5, 7 valves 19, 20 are arranged, by means of which the flow temperature can be set. The valves 19, 20 are also connected with temperature sensors.

When an installer has finished the system, he has mounted and mutually connected the individual elements. In this case, he wishes to test, if the plant or the heating system works faultlessly. Due to the relatively large thermal inertia of a floor heating, it is, for example, relatively difficult to test, if the room thermostat 15 actually influences the heating circuit 2 in the desired way.

When the installer now starts such a test, for example by pressing a "test button" on the basic unit 12, the individual elements of the heating system 1 are tested in accordance with the following method:

First, the individual elements are arranged hierarchically in steps. The upper step is, for example, made up of the basic unit 12, the next step then comprises the zone control unit 14 and the room thermostats 15 to 17. The distributor 7 with the activating elements 9 to 11 and the valves 19, 20 then form the third step. Of course, this division can also be made even more detailed.

During testing, it is firstly controlled, if the basic unit 12 works faultlessly. For this purpose, internal routines can be performed, which are known per se for such units. Only when it has been established that the basic unit works faultlessly, the test of the elements in the next step is started. Firstly, it is tested, if in fact a connection to the zone control unit 14 exists. This may, for example, be tested by means of a current flow. In connection with the room thermostats 15 to 17, it is tested whether or not a radio connection can be established. Not until it has been ascertained that a connection exists, it is tested, if the elements work in a predetermined way. For the room thermostats 15 to 17, this test can, for example, be made in that a desired value for these room thermostats 15 to 17 is changed, after which it is controlled whether or not a corresponding control signal is returned to the basic unit 12.

When, for example, it is established that in a certain case a control signal is not returned, or is not returned in a proper manner, this fault is reported. At the same time, a reference to the element in question, for example the room thermostat 17, is obtained.

When, for example, it turns out that the signal from the room thermostat 17 is too weak, the installer is informed accordingly. He then knows (or is informed) that the amplifier 18 must be inserted to obtain a sufficiently strong signal from the room thermostat 17.

During installation, the individual room thermostats 15, 16, 17 are signed in on the basic unit 12. Also the zone control unit 14 has been signed in. All elements receive an address or sign in on the basic unit 12 with their address, so that the basic unit 12 "knows" the communication partners, with which it must work. When an amplifier 18 is installed, it is signed in too.

During the test procedure, it is now tested, if the number of elements signed in corresponds with the number of elements, with which a connection can be established. If this is not the case, a fault is reported.

The next step is not tested, until it has been established that all room thermostats 15 to 17, the amplifier 18 and the zone control unit 14 work correctly. For this purpose, the basic unit 12 activates the operating elements 9 to 11, that is, valves, and it is established, if a corresponding reaction occurs. First, however, it is examined, if the signals do at all reach the corresponding elements. If this is not the case, the installer merely has to check the pipe. When the signals do arrive, a movement, however, does not occur, this indicates another fault. The movement can, for example, be measured by means of a position measuring, a current measuring or something else.

In a similar way, also the valves 19, 20 for setting the flow temperature can be tested. Also here, it is expedient to perform the test in several steps, that is, first it is checked, if the element in question is available, then, if a signal reaches the element, and finally, if the element reacts in the desired way.

The method is not limited to the start-up, that is, testing after installation. It can also be performed from time to time during operation, or it can be performed continuously.

When, for example, the receiving conditions in a house change, as shown by means of the dotted-line box 21, which is placed in the transmission path of the room thermostat 16 and shades the electro-magnetic waves, the basic unit 12 establishes that the received output is too weak. However, it "knows" that the amplifier 18 is arranged near the room thermostat 16. It therefore diverts the signals of the room thermostat 16, so that they pass the amplifier 18.

Further, the batteries in the individual room thermostats 15 to 17 can be tested, and a warning be displayed, when the voltage drops below a predetermined value, that is, the battery must be replaced.

The test routine also offers the opportunity of displaying the temperature in the individual rooms, so that it appears, if the temperature displayed corresponds to the temperature expected in the room in question. If this is not the case, something can be wrong with the room thermostats 15 to 17.

What is claimed is:

1. Method for testing a heating system having a plurality of elements including at least one basic unit, activating devices of individual heating circuits controlled by the basic unit, and setting units connected to the basic unit by way of signals, the elements in the heating system being arranged hierarchically in steps, the method comprising testing the steps one after another according to the hierarchical arrangement, with the testing of one step not being performed until the testing of a hierarchically superior step indicates a faultless state.

2. Method according to claim 1, wherein at least one of the steps includes several elements of the heating system, the testing of the elements in the at least one step does not begin until the testing of the element in the hierarchically superior step has indicated a faultless state of the element in the hierarchically superior step.

3. Method according to claim 1, wherein the testing of the element or elements in a step comprises testing during a first part if the element or elements are installed correctly and testing during a second part if the element or elements work in a predetermined way.

4. Method according to claim 1, wherein an occurrence of a fault in an element is indicated by way of a location of the fault and a kind of fault.

5. Method according to claim 1, wherein the testing includes testing if the number of setting units connected to the basic unit corresponds to the number of setting units signed in.

6. Method according to claim 1, wherein the setting units and the basic unit are connected by a wireless connection, the testing including testing whether a signal strength of received signals of a predetermined minimum value is obtained.

7. Method according to claim 6, including arranging an amplifier on a path between one of setting units and the basic unit when the signal strength of the received signal is less than the predetermined minimum value.

8. Method according to claim 7, wherein the amplifier is signed in on the basic unit.

9. Method according to claim 8, wherein the signal strength of the received signals from the setting units is tested continuously or from time to time, and, when the signal strength from one of the setting units is determined to be less than the predetermined minimum value, the signal of the one setting unit is led via an available amplifier.

10. Method according to claim 1, wherein the testing includes testing a voltage supply to the setting units.

11. Method according to claim 1, wherein each of the heating circuits heats a different individual room, and including displaying temperatures in the individual rooms.

12. Method according to claim 1, wherein the testing includes testing if the activating devices can be contacted by the basic unit and are working.

13. Method according to claim 1, wherein the heating system includes a distributor carrying out flow temperature control, the testing including testing if sensors for the detection of flow and return temperatures are available and working.

14. Method according to claim 13, wherein a valve is arranged on the distributor for influencing the flow temperature, the testing including testing whether the valve can be contacted by the basic unit and is working.

15. Method for testing a heating system having a plurality of elements including at least one basic unit, a plurality of activating devices each associated with one of several heating circuits and controlled by the basic unit, and a plurality of thermostats each connected to the basic unit, the method comprising testing each of the plurality of elements of the heating system one after another according to a predetermined hierarchical order with the testing of one element hierarchically lower in the order than an element hierarchically higher in the order does not begin until the testing of said element that is hierarchically higher in the order indicates a faultless state of said element that is hierarchically higher in the order.

16. Method according to claim 15, wherein the testing of at least some of the elements involves first testing if the element is correctly installed followed by testing if the element is operating in a predetermined way.

17. Method according to claim 16, wherein the thermostats and the basic unit are connected by a wireless connection, the testing including testing whether a signal strength of signals received by the basic unit from the thermostats is of a predetermined minimum value.

18. Method according to claim 15, wherein the testing includes testing a voltage supply to the thermostats.

19. Method according to claim 15, wherein each of the heating circuits heats a different room, and including displaying temperatures in each room.

* * * * *